United States Patent
Grosjean et al.

(10) Patent No.: US 8,429,981 B2
(45) Date of Patent: Apr. 30, 2013

(54) METHOD OF MEASURING A PHYSICAL PARAMETER AND ELECTRONIC INTERFACE CIRCUIT FOR A CAPACITIVE SENSOR FOR IMPLEMENTING THE SAME

(75) Inventors: Sylvain Grosjean, Les Fins (FR); Michel Willemin, Prêles (CH); Alexandre Deschildre, Marin (CH); Beat Pfefferli, Thielle-Wavre (CH)

(73) Assignee: EM Microelectronic-Marin SA, Marin (CH)

( * ) Notice: Subject to any disclaimer, the term of this patent is extended or adjusted under 35 U.S.C. 154(b) by 317 days.

(21) Appl. No.: 12/971,403

(22) Filed: Dec. 17, 2010

(65) Prior Publication Data

US 2011/0154906 A1 Jun. 30, 2011

(30) Foreign Application Priority Data

Dec. 24, 2009 (EP) .................................... 09180772

(51) Int. Cl.
*G01B 7/16* (2006.01)
(52) U.S. Cl.
USPC ................................ 73/771; 73/777; 73/780
(58) Field of Classification Search ...................... 73/760, 73/771, 777, 780
See application file for complete search history.

(56) References Cited

U.S. PATENT DOCUMENTS 4,741,817 A * 5/1988 Croset et al. .................. 204/425
5,321,780 A * 6/1994 Edelman ......................... 385/15

(Continued)

FOREIGN PATENT DOCUMENTS

| EP | 1 835 263 A1 | 9/2007 |
| WO | 2004/113930 | 12/2004 |
| WO | 2008/107737 A1 | 9/2008 |

OTHER PUBLICATIONS

European Search Report issued in the corresponding application No. EP 09 18 0772, completed Jun. 14, 2010.
H. Leuthold and F Rudolph, which appeared in the journal entitled "Sensors and actuators" A21-23 (1990), pp. 278 to 281.

(Continued)

*Primary Examiner* — Max Noori
(74) *Attorney, Agent, or Firm* — Griffin & Szipl, P.C.

(57) ABSTRACT

The measuring method is for measuring a physical parameter using an electronic interface circuit (1) for a capacitive sensor (2) with at least two capacitors (C1X, C2X) whose common electrode (CM) is mobile between the fixed electrodes. The electronic circuit includes an amplifier (4) connected to the common electrode (CM) by a switching unit (3), a logic unit (5) connected to the amplifier for supplying first and second digital measuring signals, and a digital-analogue converter (7) for supplying a measurement voltage ($V_{DAC}$) to the electrodes on the basis of a conversion of one of the digital signals. The method consists in polarizing firstly the electrodes of the capacitors by the measurement voltage ($V_{DAC}$) on the basis of the first digital signals, then polarizing the fixed electrode of the first capacitor (C1X) at a regulated voltage ($V_{REG}$) and the fixed electrode of the second capacitor (C2X) at a low voltage ($V_{SS}$), then polarizing the electrodes of the capacitors (C1X, C2X, CM) by the measurement voltage ($V_{DAC}$) on the basis of the second digital measuring signal, and finally polarizing the fixed electrode of the first capacitor (C1X) at a low voltage ($V_{SS}$) and the fixed electrode of the second capacitor (C2X) at a regulated voltage ($V_{REG}$). At the end of the measuring cycles, the logic unit is able, on the basis of the first and second obtained digital measuring signals, to remove any voltage offset linked to the electronic components.

12 Claims, 2 Drawing Sheets

U.S. PATENT DOCUMENTS 5,641,911 A * 6/1997 Ryhanen ......................... 73/718
5,661,373 A * 8/1997 Nishizawa ..................... 375/259
7,532,016 B2 * 5/2009 Grosjean et al. .............. 324/661
7,724,000 B2 * 5/2010 Grosjean et al. .............. 324/661

OTHER PUBLICATIONS

Yee, Yen S., et al. A 1 mV MOS Comparator in the journal IEEE, J. Solid-State Circuits, vol. SC-13. pp. 294-298 of Jun. 1978.

* cited by examiner

METHOD OF MEASURING A PHYSICAL PARAMETER AND ELECTRONIC INTERFACE CIRCUIT FOR A CAPACITIVE SENSOR FOR IMPLEMENTING THE SAME

This application claims priority from European Patent Application No. 09180772.7 filed Dec. 24, 2009, the entire disclosure of which is incorporated herein by reference.

FIELD OF THE INVENTION

The invention concerns a method of measuring a physical parameter, such as an acceleration, angular speed, force or pressure, by means of an electronic interface circuit for a capacitive sensor.

The invention also concerns an electronic interface circuit for a capacitive sensor for implementing the measuring method. The capacitive sensor is formed of at least two differential connected capacitors. A common electrode of the capacitors is capable of moving between two fixed electrodes under the action, for example, of a force in order to alter the capacitive value of each capacitor.

BACKGROUND OF THE INVENTION

In a simple conventional capacitive sensor design, the common electrode, which is mobile, forms part of an armature resiliently held between the two fixed electrodes. In this case, the capacitive sensor may be capable of performing a measurement along one direction of movement of the moving electrode. The moving electrode can move some distance in the direction of one or other of the fixed electrodes under the action of a force.

With this type of sensor with a single measurement axis, the common electrode is idle at an approximately equal distance from the two fixed electrodes, which defines equal capacitive values for the two capacitors. However, when the common electrode moves under the action for example of a force, the capacitive value of each capacitor varies inversely. The electronic interface circuit connected to the capacitive sensor thus enables an analogue output signal to be supplied. This analogue output signal takes the form of a voltage dependent on the capacitance variation of the two capacitors.

This type of electronic interface circuit for a capacitive sensor is disclosed, for example, in the article by Messrs H. Leuthold and F. Rudolph, which appeared in the journal entitled "Sensors and actuators" A21-23 (1990), pages 278 to 281.

The capacitive sensor may be an accelerometer for performing an acceleration measurement in conjunction with an electronic interface circuit. It may be a single axis accelerometer like the aforementioned capacitive sensor, or a multi-axis or tri-axis accelerometer for performing a measurement in three directions X, Y and Z. A tri-axis MEMS accelerometer of this type may include a single mass, i.e. a common inertial mass for the three pairs of differential capacitors, or three masses for the three pairs of capacitors. In the first case, a single common electrode and six fixed electrodes are provided, whereas for the second case, one common electrode with two fixed electrodes are provided for each pair of capacitors.

For a conventional electronic interface circuit for a capacitive sensor, such as a single or tri-axis MEMS accelerometer, the output voltage ideally varies in a linear manner in relation to the movement of the common moving electrode. However, since the electronic circuit is generally integrated in a semiconductor substrate, account must be taken of stray capacitances at the input, which are added to the capacitances of the sensor capacitors. These stray capacitances are practically independent of the movement of the common electrode, which creates non-linearities. Thus, the electronic circuit output voltage does not vary linearly relative to the movement of the common moving electrode. These stray capacitances also have the effect of reducing the sensitivity or gain of the electronic circuit.

The MEMS sensor serving as accelerometer is also integrated in a semiconductor substrate, such as a silicon substrate. This also leads to a problem of non-linearity linked to the potential of the substrate during operation of the sensor. The substrate potential is difficult to control across the entire structure of said sensor, since the substrate is never totally conductive. The moving electrode of the sensor can also be in a shifted position relative to the fixed electrodes in the idle mode, which can create a measuring error without calibration. Because of these non-linearities, the measured electrostatic force is not zero in the sensor and electronic circuit idle mode. Because of the influence of the substrate potential on the electrostatic force, this leads to a variation in the measured real force, which is applied across the common moving electrode, which is a drawback.

Generally, to carry out a force, acceleration or pressure measurement using the electronic circuit, the fixed electrodes of two capacitors or pairs of capacitors are biased or excited cyclically by voltages of opposite polarity relative to an inoperative reference voltage. By biasing or polarizing the two fixed electrodes at different voltage levels, the charge difference across the moving electrode can be measured and converted into at least one electronic circuit output voltage. When the output voltage or voltages are stabilised at their final value, the total charge across the moving electrode becomes zero. These output voltages can be supplied sampled to a processing circuit capable of providing acceleration, force, pressure or also angular speed data depending upon the structure of the sensor.

It is to be noted that conventionally with an integrated electronic interface circuit for a capacitive sensor, the measurement of a force, acceleration or pressure is dependent upon the aforementioned non-linearities and any voltage offset linked to unmatched electronic components. A solution for overcoming this problem has already been proposed in EP Patent Application No. 1 835 263.

In EP Patent Application No 1 835 263, the electronic circuit performs a measurement of a physical parameter, such as an acceleration, by means of a capacitive sensor, which only includes one pair of capacitors operating in differential mode. The common electrode is connected to a conventional charge transfer amplifier, whose output is connected to a first integrator which supplies a first analogue output voltage in a first series of measuring phases, and to a second integrator which supplies a second analogue output voltage in a second successive series of measuring phases. This electronic circuit is thus formed of a double symmetrical structure with the two integrators and also two excitation units for the fixed electrodes operating alternately in total symmetry.

Thus, in the first series of phases, the fixed electrodes are both biased by the first output voltage and biased by the high and low voltage levels of a supply voltage source. In the second series of phases, the fixed electrodes are both biased by the second output voltage and biased inversely to the first series of phases by the low and high voltage levels of the supply voltage source. Because of this, a voltage offset due to technology or to the variation in supply voltage can be minimised or eliminated using the two analogue integrator output voltages. Moreover, the substrate potential is no longer of any great importance given that the electronic circuit is designed with an identical double structure operating in total symmetry.

However, one drawback of this type of electronic circuit of EP Patent Application No 1 835 263 is that it supplies output signals, such as output voltages, in analogue form. This requires the use of two integrators. In these conditions, it is not possible to considerably reduce the size of the integrated components and the electric power consumption of the electronic circuit if the circuit is intended to be integrated in a silicon substrate using CMOS technology of 0.18 μm or less. Moreover, the electronic circuit is only arranged to be connected to one pair of capacitors of a capacitive sensor with a single measurement axis.

WO Patent Application No. 2004/113930, which discloses an electronic circuit connected to a single axis or multi-axis capacitive sensor for measuring an acceleration, can be cited in this regard. In relation to the aforementioned electronic circuit, a specific logic unit for each measurement axis, which processes digital measuring signals, is provided after the charge transfer amplifier, which is connected to the common moving electrode. Each logic unit supplies at output a binary measuring signal representative of a measuring voltage level dependent on the movement of the moving electrode relative to the fixed electrodes for each axis in succession. The binary measuring signal is supplied for each axis in succession to a digital-analogue converter. In one phase of each measuring cycle for a selected axis, this converter supplies a measuring voltage to the fixed electrodes alternately with a phase of polarising the fixed electrodes at a high voltage and a low voltage of a supply voltage source. The binary signal obtained at the output of each logic unit is incremented or decremented by one unit at each series of measuring phases, until the total charge across the moving electrode becomes zero. Owing to the use of the digital signal processing logic unit at the amplifier output, the size of the electronic components can be reduced and consequently also the electric power consumption of the electronic circuit output stages. However, there is nothing provided for removing the aforementioned non-linearities and voltage offsets due to technology or to the variation in supply voltage, which is a drawback. Moreover, the time for precisely stabilising the digital output signal for each measurement axis is relatively long, which is another drawback.

WO Patent Application No. 2008/107737, which discloses an electronic interface circuit for a measuring sensor and a method of activating the electronic circuit, can also be cited. The measuring sensor is formed of two differential connected capacitors for measuring acceleration. An analogue input signal is stored for the measurement after a charge transfer amplifier in one phase of a measuring cycle after the fixed electrodes of the capacitor have been polarised. The analogue signal is then converted into a digital signal stored in a logic unit of the electronic circuit. The digital signal is subsequently converted by a digital-analogue converter into an analogue return signal in the form of a voltage, which is applied to all the sensor electrodes in a successive phase of each measuring cycle. In a measuring cycle, the fixed electrodes are polarized a first time by a first polarization and a second time by a second polarisation that is inverse to the first polarisation. This enables leakage currents to be removed from the electronic circuit. However, a large number of steps of the method are necessary to obtain a physical parameter measuring signal at output, which is a drawback.

SUMMARY OF THE INVENTION

It is thus an object of the invention to overcome the aforementioned drawbacks of the prior art by providing a method of measuring a physical parameter by means of an electronic interface circuit for a capacitive sensor, which can quickly supply precise output signals while removing any voltage offset. When the electronic circuit is integrated, the size of the components can therefore also be reduced.

The invention therefore concerns a method of measuring a physical parameter by means of an electronic interface circuit for a capacitive sensor, which includes at least two differential connected capacitors whose common electrode is capable of moving relative to each fixed electrode of the two capacitors to alter the capacitive value of each capacitor when the physical parameter is being measured, said electronic circuit including a charge transfer amplifier connected to the common electrode via a switching unit, a logic unit connected to the amplifier output for digital processing of the data supplied by the amplifier and for supplying digital measuring signals, and a digital-analogue converter capable of supplying a measurement voltage to the electrodes via the switching unit, the measurement voltage being defined on the basis of a binary word conversion defining at least one of the digital measuring signals, the method including, in each successive measuring cycle, steps consisting in:

a) polarising the electrodes of the capacitors via the switching unit with a measurement voltage supplied by the digital-analogue converter on the basis of a first digital measuring signal of a preceding cycle or a first initial binary word supplied by the logic unit, the first digital signal depending on a first polarisation of the fixed electrodes of the capacitors, b) polarising the fixed electrode of the first capacitor at a regulated high voltage of a supply voltage source for the electronic circuit, and polarising the fixed electrode of the second capacitor at a low voltage of the supply voltage source, to adapt the first digital measuring signal in the logic unit, c) polarising the electrodes of the capacitors via the switching unit with a measurement voltage supplied by the digital-analogue converter on the basis of a second digital measuring signal of a preceding cycle or a second initial binary word supplied by the logic unit, the second digital signal depending on a second inverted polarisation of the first polarisation of the fixed electrodes of the capacitors, and d) polarising the fixed electrode of the first capacitor at a low voltage of the electronic circuit supply voltage source, and polarising the fixed electrode of the second capacitor at a regulated high voltage of the supply voltage source to adapt the second digital measuring signal in the logic unit, the logic unit being capable of removing any voltage offset linked to the electronic components on the basis of the first and second obtained digital measuring signals, wherein, from the start of a physical parameter measurement and during a certain number of successive measuring cycles, which include steps a) to d), the first and second digital signals are adapted in the logic unit in each cycle by implementing a dichotomy algorithm stored in the logic unit and on the basis of the output value of the charge transfer amplifier, to supply first and second adapted digital signals to the digital-analogue converter to generate the measurement voltage to be applied to the electrodes via the switching unit.

Particular steps of the measuring method are defined in the dependent claims 2 to 7.

One advantage of the measuring method lies in the fact that at least one digital output signal for a physical parameter measurement can be quickly supplied at the electronic circuit output. This digital output signal may represent the addition of a first digital measuring signal dependent on positive polarisation of the fixed electrodes and a second digital measuring signal dependent on negative polarisation of the fixed electrodes, i.e. inverted polarisation of said fixed electrodes. Each digital measuring signal is stored and refreshed in a particular register during all of the successive measuring cycles.

Another advantage of the measuring method lies in the fact that a dichotomy algorithm is used for a certain number of cycles in order to converge quickly on a final value for each digital measuring signal. The most significant bits of the binary word of each digital measuring signal are used from the most significant bit to the least significant bit during the successive cycles by using the dichotomy algorithm. 8 successive measuring cycles can be provided using the dichotomy algorithm with a binary word including, for example, 10 bits with 8 most significant bits. Subsequently, oversampling cycles are used by adjusting the least significant bits of the binary word. 8 oversampling cycles can be provided following the 8 cycles using the dichotomy algorithm.

The invention therefore also concerns the aforecited electronic interface circuit for a capacitive sensor for implementing the measuring method, the electronic circuit including a charge transfer amplifier connected to the common electrode via a switching unit, a logic unit connected to the amplifier output for digital processing of the data supplied by the amplifier and for supplying first and second digital measuring signals, dependent respectively on a first polarisation of the fixed electrodes of the capacitors and a second inverted polarisation of the first polarisation, and a digital-analogue converter capable of supplying a measurement voltage to the electrodes via the switching unit, the measurement voltage being defined on the basis of a binary word conversion relating to the first digital measuring signal or the second digital measuring signal, wherein the logic unit includes storage means in which at least one dichotomy algorithm is stored, the logic unit being capable, by means of a processor, of starting the dichotomy algorithm in first physical parameter measuring cycles to adapt the first and second digital measuring signals on the basis of the output value of the charge transfer amplifier so as to supply adapted first and second digital signals to the digital-analogue converter to generate the measurement voltage to be applied to the electrodes via the switching unit.

Specific embodiments of the electronic circuit are defined in the dependent claims 9 to 12.

One advantage of the electronic interface circuit for a physical sensor lies in the fact that it can quickly provide stabilised digital measuring signals at output owing to digital processing immediately after the charge transfer amplifier. These digital measuring signals are processed in the logic unit. These digital signals are adapted from the first measuring cycles by using a dichotomy algorithm. Two digital signals depending on positive polarisation and negative polarisation of the fixed electrodes of the pair of capacitors are provided in the logic unit. By combining the digital signals this enables any voltage offset to be removed from the electronic circuit components.

Another advantage of the electronic interface circuit for a physical sensor lies in the fact that it can provide two digital signals for each axis of a tri-axis sensor. A single amplifier, a logic unit and a single digital-analogue converter are thus provided for measuring the physical parameter on the three axes. This limits redundancy in the electronic circuit.

BRIEF DESCRIPTION OF THE DRAWINGS

The objects, advantages and features of the method of measuring a physical parameter and the electronic interface circuit for a capacitive sensor for implementing the same will appear more clearly in the following description with reference to the drawings, in which.

DETAILED DESCRIPTION OF THE INVENTION

Since various components of the electronic interface circuit for a sensor with differential capacitors are well known in this technical field, they will not all be explained in detail in the following description. Emphasis is mainly placed on the method of measuring a physical parameter by means of an electronic circuit which supplies digital measuring signals at output.

Figure 1:
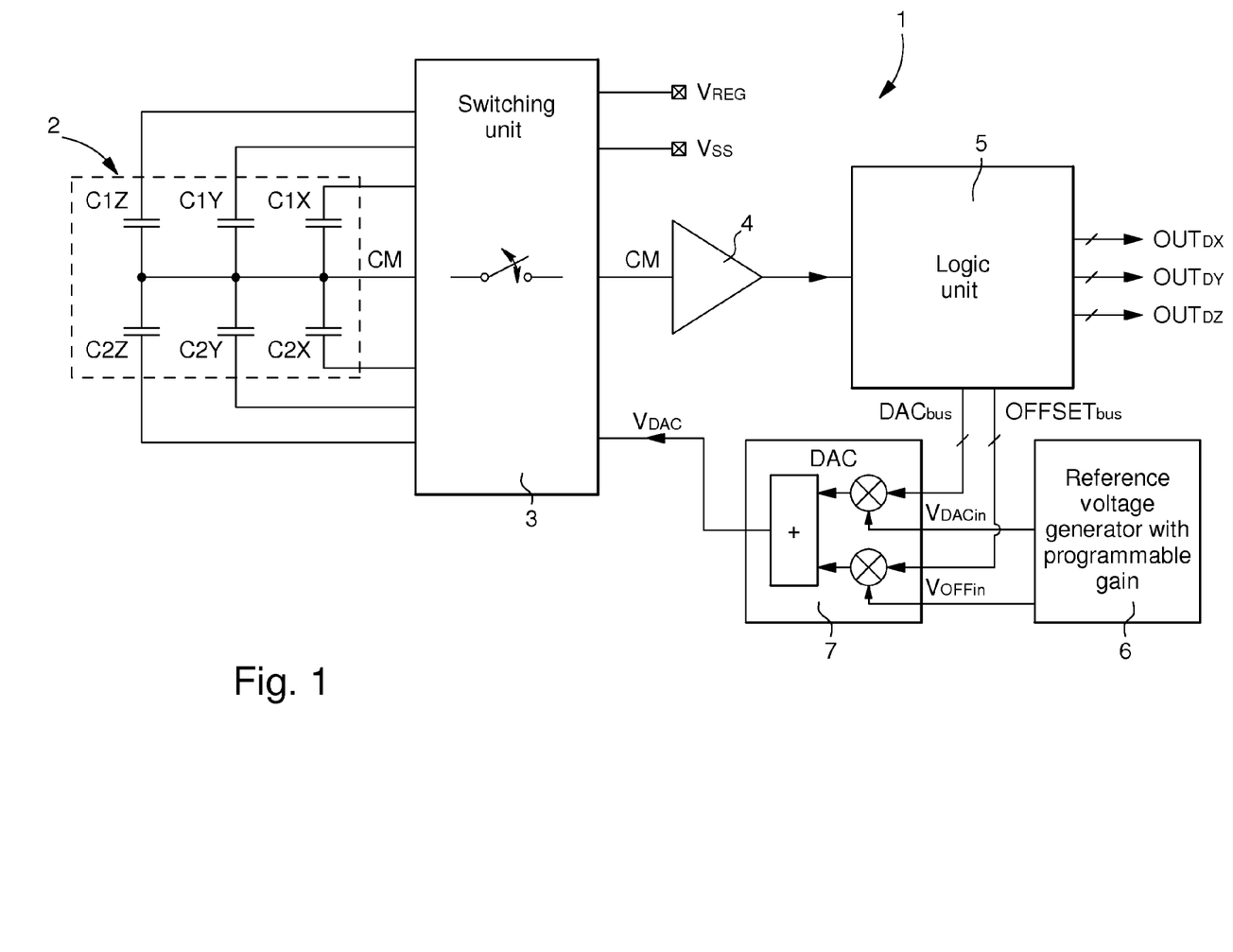
FIG. 1 shows in a simplified manner an electronic interface circuit for a capacitive sensor for implementing the method of measuring a physical parameter according to the invention.

FIG. 1 shows a simplified diagram of the various components of electronic interface circuit 1 for a capacitive sensor 2 according to the invention. In this embodiment, a tri-axis capacitive MEMS sensor 2 with a single mass is connected to electronic circuit 1, although it is entirely possible to envisage connecting a tri-axis sensor with three moving masses or a single axis sensor. This capacitive sensor is thus formed of three pairs of capacitors C1X, C2X, C1Y, C2Y, C1Z and C2Z. The two capacitors of each pair are differential connected. A common electrode CM of the pairs of capacitors is capable of moving under the action of a force between two fixed electrodes of each pair of capacitors to make a measurement taking account of the three axes X, Y and Z. Electronic circuit 1 can supply digital measuring signals for each axis, which are relative to a physical parameter, such as an acceleration, angular speed, pressure or force, as a function of the movement of the common moving electrode. In the case of an acceleration measurement, the electronic circuit can be configured to supply digital measuring signals between minimum and maximum acceleration values. One may choose, for example, to configure the electronic circuit to supply digital measuring signals within the −2 g to +2 g acceleration range. A variation in voltage of around 3 to 20 mV can be counted for 1 g of acceleration.

Moving electrode CM may form part of the armature of a sensor resiliently held in a central position when in idle or off mode between the two fixed electrodes of each pair of capacitors C1X, C2X, C1Y, C2Y, C1Z and C2Z. Electronic circuit 1 may be powered by a continuous voltage source (not shown), which supplies a regulated high voltage $V_{REG}$ to a first terminal and a low voltage $V_{SS}$ to a second terminal. The low voltage can be defined at 0 V, whereas the regulated high voltage can be set at 1.65 V for example. The fixed electrode of each capacitor can be polarised in a measuring cycle phase, either at high voltage $V_{REG}$ or at low voltage $V_{SS}$ in an operating mode of the electronic circuit. Consequently, since the two capacitors C1X, C2X, C1Y, C2Y, C1Z and C2Z of each pair have an equal capacitive value when sensor 2 is in an idle mode, the voltage across common electrode CM is preferably equal in idle mode to an intermediate voltage $V_{REG}/2$ between regulated voltage $V_{REG}$ and low voltage $V_{SS}$ at 0 V.

The digital measuring signals supplied by electronic circuit 1 are proportional for two capacitors C1 and C2 at (C1−C2)/(C1+C2). Once the digital measuring signals are stabilised at a final physical parameter measurement, any flow of charges across the two capacitors of each pair is cancelled out. Thus the object of the electronic circuit consists in finding a voltage to apply across each fixed electrode in a charge equalising phase, which satisfies $(V_{REG}-V_{DAC}) \cdot C1 = (V_{DAC}-V_{SS}) \cdot C2$. This is achieved when $V_{DAC} = (V_{REG}/2) \cdot (1+(C1-C2)/(C1+C2))$.

Electronic circuit 1 includes a comparator type charge transfer amplifier 4, which is directly connected to moving electrode CM of the capacitors via a switching unit 3. Switching unit 3 receives voltages $V_{REG}$, $V_{SS}$ and $V_{DAC}$ to be applied to the sensor electrodes in accordance with the measuring cycle phases. The regulated voltage $V_{REG}$ and low voltage $V_{SS}$ are applied to the fixed electrodes, whereas voltage $V_{DAC}$, from a digital-analogue converter 7 in inverse feedback, is applied to all the electrodes. The voltages applied to the electrodes during a measuring cycle are explained below with reference to FIG. 2.

Comparator amplifier 4 is of very simple design of the type disclosed in the article entitled "A 1 mV MOS Comparator" in the journal IEEE, J. Solid-State Circuits, vol. SC-13. pp. 294-298 of June 1978. This comparator amplifier 4 generally includes a capacitor at input connected to common electrode CM, followed by amplifier stages for supplying an all or nothing digital signal at output. This charge transfer amplifier has a very high gain. The amplifier output signal is at the "1" state close to regulated voltage $V_{REG}$ when the voltage across moving electrode CM increases via the accumulation of positive charges in the measuring cycles. However, the amplifier output signal passes to the "0" state close to low voltage $V_{SS}$ when the voltage across moving electrode CM decreases via the accumulation of negative charges in the measuring cycles.

Electronic circuit 1 also includes a logic unit 5, which includes storage means, a processor clocked by a conventional clock signal, at least one counter connected to the processor and several registers for storing binary measuring words for each measurement axis. There are two registers (not shown) per measurement axis, which means six registers for the three measurement axes. For each axis, a first register receives a first digital measuring signal from a defined positive polarisation (pol at "0") of the fixed electrodes of the corresponding pair of capacitors, whereas a second register receives a second digital measuring signal from a defined negative polarisation (pol at "1") of the fixed electrodes of the corresponding pair of capacitors. As explained below, the negative polarisation is simply an inverted polarisation of the positive polarisation. By combining or adding the two registers per measurement axis, this enables logic unit 5 to supply a digital output signal $OUT_{DX}$, $OUT_{DY}$, $OUT_{DZ}$, from which any voltage offset has been removed.

The digital measuring signal of each register can be a binary word for example in 10 bits. The counter, in conjunction with the processor, enables a "1" state or a "0" state to be placed in one binary word position on the basis of the signal supplied by comparator amplifier 4. According to the measuring method explained below, a dichotomy algorithm is used for the first measuring cycles before a final value is obtained. It is thus the most significant bits that are altered in each register to start the dichotomy algorithm stored in the storage means as explained below. In the dichotomy phase, the bit counter has to change in accordance with bit=comp XNOR pol, where comp is the output value of comparator amplifier 4 and pol defines the positive polarisation or negative polarisation. The binary word of each register is adapted at each successive measuring cycle and for each axis.

Each binary word DACbus of the registers is supplied in succession in each measuring cycle to a DAC digital-analogue converter 7 so as to convert the binary word DACbus into an output voltage $V_{DAC}$. This DAC output voltage allows all of capacitors C1X, C2X, C1Y, C2Y, C1Z, C2Z and CM to be discharged in one of the measuring cycle phases to a voltage value dependent on the binary word DACbus of a particular axis. Binary word DACbus is multiplied in a first multiplier in digital-analogue converter 7 by a reference voltage $V_{DACin}$, which comes from a reference voltage generator with a programmable gain 6. This reference voltage can be supplied by means of a resistive divider connected between regulated voltage $V_{REG}$ and earth $V_{SS}$.

Logic unit 5 also supplies a binary adjusting word OFFSETbus (10 bits) of a voltage offset relating to the MEMS sensor at input. This binary adjusting word OFFSETbus is multiplied in a second multiplier in digital-analogue converter 7 with an adjusting voltage $V_{OFFin}$, which comes from programmable gain reference voltage generator 6. This adjusting voltage $V_{OFFin}$ can also be obtained by means of a resistive divider connected between regulated voltage $V_{REG}$ and earth $V_{SS}$. The output voltages of the two multipliers of converter 7 are then added so that the digital-analogue converter supplies voltage $V_{DAC}$ at output. As will be seen below, the voltage offset linked to the MEMS sensor does not depend on the polarisation applied to the fixed electrodes of the pairs of capacitors. A preliminary calibrating step for correcting this MEMS sensor voltage offset can be performed once and for all before the physical parameter is measured by electronic circuit 1.

Since binary words DACbus and OFFSETbus are over 10 bits from 0 to 1023, output voltage $V_{DAC}$ from a positive polarisation (polarity "0") of the fixed electrodes and a negative polarisation (polarity "1") of the fixed electrodes, can be expressed. These two equations eq(0) and eq(1) of the two voltages $V_{DAC}$ are expressed as follows:

$$V_{DAC}(0) = V_{REG}/2 + V_{DACoffset} + (DACbus(0) - 512) \cdot K_{DAC} \cdot V_{REG} + (OFFSETbus - 512) \cdot K_{OFF} \cdot V_{REG} \quad \text{eq}(0)$$

$$V_{DAC}(1) = V_{REG}/2 + V_{DACoffset} - (DACbus(1) - 512) \cdot K_{DAC} \cdot V_{REG} - (OFFSETbus - 512) \cdot K_{OFF} \cdot V_{REG} \quad \text{eq}(1)$$

$K_{DAC}$ is a factor that defines the system gain. This gain can be programmable for example by generating a voltage $V_{DACin}$ which comes from a resistive divider of the reference voltage generator 6. $K_{OFF}$ is a factor which defines the gain of the adjusting circuitry of the MEMS sensor voltage offset. This gain can be adapted in accordance with the desired adjusting range for example by generating a voltage $V_{OFFin}$ which comes from another resistive divider of the reference voltage generator 6. DACbus(0) defines the 10 bit binary word which comes from a first register of logic unit 5, which is applied to DAC converter 7 during the positive polarisation phases. This binary word is defined from 0 to 1023. DACbus(1) defines the 10 bit binary word which comes from a second register of logic unit 5, which is applied to DAC converter 7 during the negative polarisation phases. This binary word is defined from 0 to 1023. OFFSETbus defines the 10 bit binary adjusting word which is applied to DAC converter 7 to correct the voltage offset linked to the MEMS sensor. $V_{DACoffset}$ represents the stray voltage offset of DAC converter 7 which it is wished to remove. This stray voltage offset covers any voltage offset linked to the electronic circuit (amplifier, converter, . . . ), and may also represent the flicker noise frequency.

It is also to be noted that DACbus(0) may be different from DACbus(1) if an acceleration is being measured, since these binary words depend on the state of polarisation applied to the fixed electrodes. However, OFFSETbus does not depend in any way on the polarisation applied to the fixed electrodes. Thus OFFSETbus is selected permanently after the preliminary step of calibrating the MEMS sensor linked to the electronic circuit as indicated above. This binary adjusting word can be stored in the storage means of logic unit 5. If the MEMS sensor needs a voltage variation $V_{MEMS}$ around $V_{REG}/2$ in order to balance the charges, equations eq(0) and eq(1) take the following form:

$$V_{REG}/2 + V_{MEMS} = V_{REG}/2 + V_{DACoffset} + (DACbus(0) - 512) \cdot K_{DAC} \cdot V_{REG} + (OFFSETbus - 512) \cdot K_{OFF} \cdot V_{REG} \quad \text{eq(0)}$$

$$V_{REG}/2 - V_{MEMS} = V_{REG}/2 + V_{DACoffset} - (DACbus(1) - 512) \cdot K_{DAC} \cdot V_{REG} - (OFFSETbus - 512) \cdot K_{OFF} \cdot V_{REG} \quad \text{eq(1)}$$

If capacitance C1X is greater than capacitance C2X for example, the charge balancing occurs at a higher voltage than $V_{REG}/2$ for the positive polarisation and a lower voltage than $V_{REG}/2$ for a negative polarisation. If these two equations eq(0) and eq(1) are subtracted one of the other, this gives the following equation eq(2):

$$2 \cdot V_{MEMS} = (DACbus(0) + DACbus(1) - 1024) \cdot K_{DAC} \cdot V_{REG} + 2 \cdot (OFFSETbus - 512) \cdot K_{OFF} \cdot V_{REG} \quad \text{eq(2)}$$

DACbus(0)+DACbus(1)−1024 is proportional to $V_{MEMS}$ which is also proportional to the acceleration. The term $V_{DACoffset}$ has disappeared from equation eq(2) which is the ultimate objective. The system gain thus depends on the choice of $K_{DAC}$. The MEMS sensor voltage offset can thus still be eliminated by proper selection of binary word OFFSETbus.

Figure 2:
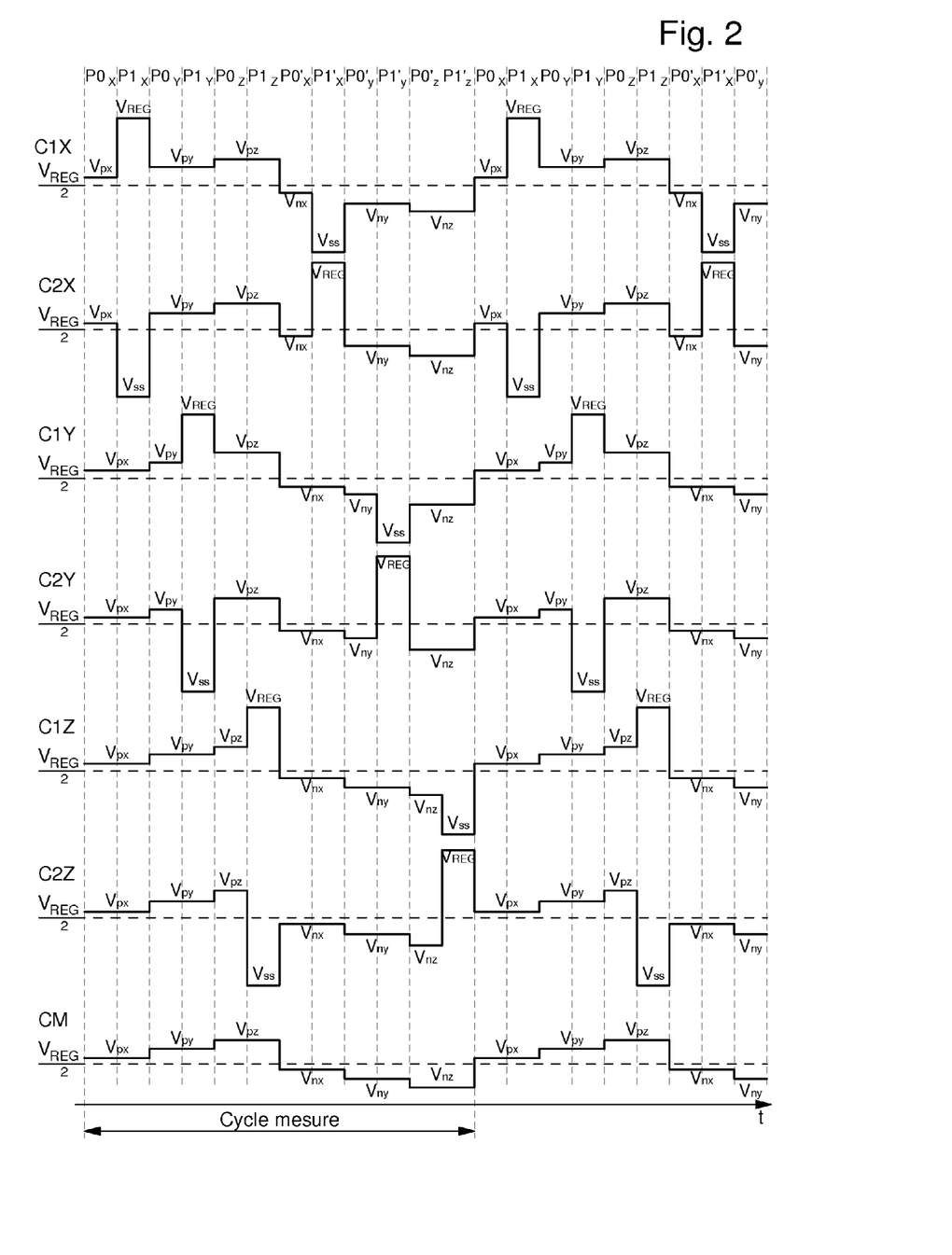
FIG. 2 shows a temporal diagram of the various voltage signals in the final successive measuring cycles of the operation of the electronic interface circuit for a capacitive sensor according to the invention.

For improved comprehension of the operation of the electronic interface circuit for the tri-axis capacitive sensor, reference can first be made to FIG. 2, which shows a temporal diagram of various voltage signals across the capacitor electrodes. For the sake of simplification, the temporal diagram of FIG. 2 relates to a stabilisation stage of the digital output signals for each measurement axis in accordance with an acceleration applied to the moving mass of the MEMS sensor. In this case, the moving electrode is closer to fixed electrodes C1X, C1Y, C1Z than to complementary fixed electrodes C2X, C2Y, C2Z. Thus, capacitance C1X is greater than capacitance C2X, capacitance C1Y is greater than capacitance C2Y and capacitance C1Z is greater than capacitance C2Z. Moreover, the acceleration is greater in the direction of the Z axis than that of the Y axis, which is also greater than acceleration on the X axis.

In FIG. 2, the voltage $V_{DAC}$ applied across fixed electrodes C1X, C2X, C1Y, C2Y, C1Z, C2Z and common electrode CM depends on each successive binary word of the registers. The logic unit registers store the digital measuring signals with positive polarisation and negative polarisation for each axis. Consequently, voltage $V_{DAC}$ corresponds to Vpx or Vnx for positive or negative polarisation of the fixed electrodes of capacitors C1X and C2X, to Vpy or Vny for positive or negative polarisation of the fixed electrodes of capacitors C1Y and C2Y, and to Vpz or Vnz for positive or negative polarisation of the fixed electrodes of capacitors C1Z and C2Z.

A measuring cycle is normally divided into 12 successive phases, once with positive polarisation of the fixed electrodes of the three pairs of capacitors, and once with negative polarisation of the fixed electrodes of the three pairs of capacitors. The duration of a phase may be around 2 μs. In a first phase $P0_X$, all of the electrodes of the capacitors are polarised with voltage $V_{DAC}$ at value Vpx. This voltage Vpx is obtained via digital-analogue converter 7 of FIG. 1 on the basis of the first register of logic unit 5. This first register relates to the X axis for positive polarisation of the fixed electrodes of capacitors C1X and C2X of a preceding cycle. In a second phase $P1_X$, the fixed electrode of the first capacitor C1X is polarised at regulated voltage $V_{REG}$, while the fixed electrode of the second capacitor C2X is polarised at low voltage $V_{SS}$. The other electrodes are kept at voltage Vpx.

In a third phase $P0_Y$, all of the capacitor electrodes are polarised with voltage $V_{DAC}$ at value Vpy. This voltage Vpy is obtained via digital-analogue converter 7 of FIG. 1 on the basis of the first register of logic unit 5. This first register relates to the Y axis for positive polarisation of the fixed electrodes of capacitors C1Y and C2Y of a preceding cycle. In a fourth phase $P1_Y$, the fixed electrode of the first capacitor C1Y is polarised at regulated voltage $V_{REG}$, while the fixed electrode of the second capacitor C2Y is polarised at low voltage $V_{SS}$. The other electrodes are kept at voltage Vpy.

In a fifth phase $P0_Z$, all the capacitor electrodes are polarised with voltage $V_{DAC}$ at value Vpz. This voltage Vpz is obtained via digital-analogue converter 7 of FIG. 1 on the basis of the first register of logic unit 5. This first register relates to the Z axis for positive polarisation of the fixed electrodes of capacitors C1Z and C2Z of a preceding cycle. In a sixth phase $P1_Z$, the fixed electrode of the first capacitor C1Z is polarised at regulated voltage $V_{REG}$, while the fixed electrode of the second capacitor C2Z is polarised at low voltage $V_{SS}$. The other electrodes are kept at voltage Vpz.

In a seventh phase $P0'_X$, all the electrodes of the capacitors are polarised with voltage $V_{DAC}$ at value Vnx. This voltage Vnx is obtained via digital-analogue converter 7 of FIG. 1 on the basis of the second register of logic unit 5. This second register relates to the X axis for negative polarisation of the fixed electrodes of capacitors C1X and C2X of a preceding cycle. In an eighth phase $P1'_X$, the fixed electrode of the first capacitor C1X is polarised at low voltage $V_{SS}$, while the fixed electrode of the second capacitor C2X is polarised at regulated voltage $V_{REG}$. The other electrodes are kept at voltage Vnx.

In a ninth phase $P0'_Y$, all the electrodes of the capacitors are polarised with voltage $V_{DAC}$ at value Vny. This voltage Vny is obtained via digital-analogue converter 7 of FIG. 1 on the basis of the second register of logic unit 5. This first register relates to the Y axis for negative polarisation of the fixed electrodes of capacitors C1Y and C2Y of a preceding cycle. In a tenth phase $P1'_Y$, the fixed electrode of the first capacitor C1Y is polarised at low voltage $V_{SS}$, while the fixed electrode of the second capacitor C2Y is polarised at regulated voltage $V_{REG}$. The other electrodes are kept at voltage Vny.

In an eleventh phase $P0'_Z$, all of the capacitor electrodes are polarised with voltage $V_{DAC}$ at value Vnz. This voltage Vnz is obtained via digital-analogue converter 7 of FIG. 1 on the basis of the second register of logic unit 5. This second register relates to the Z axis for negative polarisation of the fixed electrodes of capacitors C1Z and C2Z of a preceding cycle. Finally, in a twelfth phase $P1'_Z$, the fixed electrode of first capacitor C1Z is polarised at low voltage $V_{SS}$, while the fixed electrode of the second capacitor C2Z is polarised at regulated voltage $V_{REG}$. The other electrodes are kept at voltage Vnz.

Several cycles of 12 phases are repeated in succession to take the physical parameter measurement such as an acceleration by means of the tri-axis sensor. One conversion for a measurement axis corresponds to 16 charge transfers. The duration of the conversion for the three measurement axes may be less than 500 μs if the duration of each phase is around 2 μs or less. The dichotomy algorithm is used in the first 8 measuring cycles, whereas oversampling is used for the next 8 measuring cycles. From the start of a physical parameter measurement, generally in the first cycle all of voltages $V_{DAC}$ of phases 0, 2, 4, 6, 8 and 10 have a value of $V_{REG}/2$. In phases 1, 3 and 5, the fixed electrodes of C1X, C1Y and C1Z are polarised in succession at $V_{REG}$, while the fixed electrodes of C2X, C2Y and C2Z are polarised in succession at $V_{SS}$. In phases 7, 9 and 11, the fixed electrodes of C1X, C1Y and C1Z are polarised in succession at $V_{SS}$, while the fixed electrodes of C2X, C2Y and C2Z are polarised in succession at $V_{REG}$. The various phases of a measuring cycle are also indicated in the following table.

|  | Polarity | | | | | | | | | | | |
|---|---|---|---|---|---|---|---|---|---|---|---|---|
|  | 0 | | | | | | 1 | | | | | |
|  | Selected axis | | | | | | | | | | | |
|  | X | | Y | | Z | | X | | Y | | Z | |
|  | Phases | | | | | | | | | | | |
|  | 0 | 1 | 2 | 3 | 4 | 5 | 6 | 7 | 8 | 9 | 10 | 11 |
| C1X | Vpx | Vreg | Vpy | Vpy | Vpz | Vpz | Vnx | Vss | Vny | Vny | Vnz | Vnz |
| C2X |  | Vss |  | Vpy |  | Vpz |  | Vreg |  | Vny |  | Vnz |
| C1Y |  | Vpx | Vreg |  |  | Vpz |  | Vnx | Vss |  |  | Vnz |
| C2Y |  | Vpx | Vss |  |  | Vpz |  | Vnx | Vreg |  |  | Vnz |
| C1Z |  | Vpx |  | Vpy | Vreg |  |  | Vnx |  | Vny | Vss |  |
| C2Z |  | Vpx |  | Vpy | Vss |  |  | Vnx |  | Vny | Vreg |  |
| CM |  | Vpx |  | Vpy |  | Vpz |  | Vnx |  | Vny |  | Vnz |

As indicated above, a physical parameter measurement starts with 8 cycles using the dichotomy algorithm stored in the storage means of logic unit 5 of FIG. 1. These first 8 cycles are normally referenced from 0 to 7 and allow the digital-analogue converter DAC 7 to converge at a balancing voltage $V_{DAC}$ for each measured axis. The code DACbus supplied to the converter is a 10 bit binary word, which is formed of 2 least significant bits LSB and 8 most significant bits referenced MSB-0 to MSB-7 from the smallest to the largest. In the first cycle 0, the code DACbus supplied to converter 7 is defined with the most significant bit MSB-7 at 1, which is "1000000000" for a value 512, which has to define the intermediate voltage $V_{REG}/2$ without any voltage offset. At the end of cycle 0, this code DACbus and the value supplied by comparator amplifier 4 are evaluated. If (comp XNOR pol) is equal to "1", the most significant bit MSB-7 is kept for the next cycle, otherwise it is changed to 0. However, the most significant bit MSB-6 changes to 1 for the next cycle. In succession, the most significant bits from the largest MSB-7 to the smallest MSB-0 are adapted for the first 8 measuring cycles using the dichotomy algorithm.

At the end of the first 8 cycles, only the two least significant bits LSB are left to adapt for each register of logic unit 5. In the next 8 measuring cycles, oversampling is used, i.e. for the cycles referenced 8 to 15. The value of the counter or counters for the positive polarisation and negative polarisation digital signals must be incremented if comp="1" and decremented if comp="0". Normally three measuring cycles would be enough to establish the two least significant bits, but it is preferable to carry out eight measuring cycles to reduce noise.

In the above description, for each measuring cycle, six phases were performed for the three axes with positive polarisation, followed by six phases for the three axes with negative polarisation. However, it is also possible to envisage providing the first four phases for positive polarisation and negative polarisation of the capacitors of the X axis, followed by four phases for positive polarisation and negative polarisation of the capacitors of the Y axis, followed finally by four phases for positive polarisation and negative polarisation of the capacitors of the Z axis.

In the case of a single axis capacitive sensor with a single pair of capacitors, each measuring cycle has only four phases with the positive polarisation and negative polarisation of the fixed electrodes of the capacitors. With a single axis sensor, the digital measuring signals are supplied more quickly using the dichotomy algorithm for the first 8 measuring cycles, followed by the 8 oversampling cycles.

From the description that has just been given, multiple variants of the method of measuring a physical parameter and the electronic interface circuit for the capacitive sensor for implementing the same can be devised by those skilled in the art without departing from the scope of the invention defined by the claims. It is possible to envisage altering the duration of each phase in relation to the other, or the duration of each cycle during the physical parameter measuring operations. The order of the positive and negative polarisations can be altered in each measuring cycle. At least two additional phases of the electronic circuit operation test can also be placed in each measuring cycle.

What is claimed is:

1. A method of measuring a physical parameter by means of an electronic interface circuit for a capacitive sensor, which includes at least two differential connected capacitors whose common electrode is capable of moving relative to each fixed electrode of the two capacitors to alter the capacitive value of each capacitor when the physical parameter is being measured, said electronic circuit including a charge transfer amplifier connected to the common electrode via a switching unit, a logic unit connected to the amplifier output for digital processing of the data supplied by the amplifier and for supplying digital measuring signals, and a digital-analogue converter capable of supplying a measurement voltage to the electrodes via the switching unit, the measurement voltage being defined on the basis of a binary word conversion defining at least one of the digital measuring signals, the method including, in each successive measuring cycle, steps consisting in:

a) polarising the electrodes of the capacitors via the switching unit with a measurement voltage supplied by the digital-analogue converter on the basis of a first digital measuring signal of a preceding cycle or a first initial binary word supplied by the logic unit, the first digital signal depending on a first polarisation of the fixed electrodes of the capacitors, b) polarising the fixed electrode of the first capacitor at a regulated high voltage of a supply voltage source for the electronic circuit, and polarising the fixed electrode of the second capacitor at a low voltage of the supply voltage source, to adapt the first digital measuring signal in the logic unit, c) polarising the electrodes of the capacitors via the switching unit with a measurement voltage supplied by the digital-analogue converter on the basis of a second digital measuring signal of a preceding cycle or a second initial binary word supplied by the logic unit, the second digital signal depending on a second inverted polarisation of the first polarisation of the fixed electrodes of the capacitors, and d) polarising the fixed electrode of the first capacitor at a low voltage of the electronic circuit supply voltage source, and polarising the fixed electrode of the second capacitor at a regulated high voltage of the supply voltage source to adapt the second digital measuring signal in the logic unit, the logic unit being capable of removing any voltage offset linked to the electronic components on the basis of the first and second obtained digital measuring signals, wherein, from the start of a physical parameter measurement and during a certain number of successive measuring cycles, which include steps a) to d), the first and second digital signals are adapted in the logic unit in each cycle by implementing a dichotomy algorithm stored in the logic unit and on the basis of the output value of the charge transfer amplifier, to supply first and second adapted digital signals to the digital-analogue converter to generate the measurement voltage to be applied to the electrodes via the switching unit.

2. The measuring method according to claim 1, wherein the logic unit includes a first register for storing the first digital measuring signal in 10 bits, and a second register for storing the second digital measuring signal in 10 bits, wherein the dichotomy algorithm is used from the start of a physical parameter measurement, such as an acceleration, force, angular speed or pressure, for 8 successive cycles, and wherein, during the first 8 measuring cycles, logic unit adapts the binary word of each digital measuring signal in succession from the most significant bit to the least significant bit with 8 most significant bits.

3. The measuring method according to claim 1, wherein oversampling steps are performed in measuring cycles, which follow the measuring cycles using the dichotomy algorithm, to adapt and stabilise in the logic unit in each cycle the first and second digital measuring signals, which are supplied to the digital-analogue converter to generate the measurement voltage to be applied to the electrodes via the switching unit.

4. The measuring method according to claim 3, wherein the oversampling steps are carried out in each measuring cycle to adapt the two least significant bits of each 10 bit binary word during at least 8 successive cycles so as to remove noise.

5. The measuring method according to claim 1, wherein the capacitive sensor is of the tri-axis type with three pairs of differential connected capacitors with one common electrode per pair or for all the pairs and two fixed electrodes for each pair, and the logic unit of the electronic circuit is capable of supplying first and second digital measuring signals for each measuring axis X, Y and Z, wherein the method includes 12 successive phases per measuring cycle, which consist in repeating in succession during the first six phases the steps a) and b) for each axis X, Y, Z with the first digital signal corresponding to the selected axis, and in repeating in succession during the last six phases the steps c) and d) for each axis X, Y, Z with the second digital signal corresponding to the selected axis.

6. The measuring method according to claim 1, wherein the capacitive sensor is of the tri-axis type with three pairs of differential connected capacitors with one common electrode per pair or for all the pairs and two fixed electrodes for each pair, and wherein the logic unit of the electronic circuit is capable of supplying first and second digital measuring signals for each measuring axis X, Y and Z, wherein the method includes 12 successive phases per measuring cycle, which consist in performing the steps a) to d) for the X axis with the first and second digital measuring signals of the X axis, in performing steps a) to d) for the Y axis after the X axis with the first and second digital measuring signals of the Y axis, and finally in performing steps a) to d) for the Z axis, after the Y axis, with the first and second digital measuring signals of the Z axis.

7. The measuring method according to claim 1, wherein in a preliminary step before the physical parameter measurement, a calibrating operation depending on the MEMS capacitive sensor is performed so as to store a binary adapting word in the logic unit and to supply said binary word to the digital-analogue converter for adapting the measurement voltage.

8. An electronic interface circuit for a capacitive sensor, which includes a pair of differential connected capacitors for implementing the measuring method according to claim 1, the electronic circuit including a charge transfer amplifier connected to the common electrode via a switching unit, a logic unit connected to the amplifier output for digital processing of the data supplied by the amplifier and for supplying first and second digital measuring signals, dependent respectively on a first polarisation of the fixed electrodes of the capacitors and a second inverted polarisation of the first polarisation, and a digital-analogue converter capable of supplying a measurement voltage to the electrodes via the switching unit, the measurement voltage being defined on the basis of a binary word conversion relating to the first digital measuring signal or the second digital measuring signal, wherein the logic unit includes storage means in which at least one dichotomy algorithm is stored, the logic unit being capable, by means of a processor, of starting the dichotomy algorithm in first physical parameter measuring cycles to adapt the first and second digital measuring signals on the basis of the output value of the charge transfer amplifier so as to supply adapted first and second digital signals to the digital-analogue converter to generate the measurement voltage to be applied to the electrodes via the switching unit.

9. The electronic circuit according to claim 8, as an interface for a tri-axis capacitive sensor, which includes three pairs of differential connected capacitors, wherein it includes a single charge transfer amplifier for measurement on the three measuring axes X, Y and Z of the sensor, the amplifier being capable of supplying digital type data to the logic unit, and wherein the logic unit supplies first and second digital measuring signals for each measuring axis X, Y, Z.

10. The electronic circuit according to claim 8, wherein the logic unit includes six registers for storing the first and second digital measuring signals of each axis, each register being defined in 10 bits.

11. The electronic circuit according to claim 8, wherein it includes a reference voltage generator with a programmable gain, said generator supplying a programmed reference voltage to the digital-analogue converter on the basis of the desired measurement range of the physical parameter, said reference voltage is multiplied in a first multiplier by the binary word of the first digital measuring signal or the second digital measuring signal to supply the measurement voltage at the converter output.

12. The electronic circuit according to claim 11, wherein a binary adapting word linked to the capacitive sensor is supplied to the digital-analogue converter to be multiplied in a second multiplier by a second programmed reference voltage of the reference voltage generator, the output voltages of the two multipliers being added together to supply the measurement voltage at the converter output.

* * * * *